United States Patent
Gao et al.

(10) Patent No.: US 8,583,054 B2
(45) Date of Patent: Nov. 12, 2013

(54) WIRELESS DISPLAY PERFORMANCE ENHANCEMENT

(75) Inventors: Jie Gao, Sunnyvale, CA (US); Xintian E. Lin, Palo Alto, CA (US); Xue Yang, Arcadia, CA (US); Leora Roth, Raanana (IL)

(73) Assignee: Intel Corporation, Santa Clara, CA (US)

( * ) Notice: Subject to any disclaimer, the term of this patent is extended or adjusted under 35 U.S.C. 154(b) by 221 days.

(21) Appl. No.: 12/978,559

(22) Filed: Dec. 25, 2010

(65) Prior Publication Data

US 2012/0164961 A1  Jun. 28, 2012

(51) Int. Cl.
*H04B 17/00* (2006.01)
*H04K 3/00* (2006.01)

(52) U.S. Cl.
USPC ............................ 455/67.13; 455/7; 455/41.2

(58) Field of Classification Search
USPC ......... 455/7, 9, 11.1, 41.2, 41.3, 67.11, 67.13
See application file for complete search history.

(56) References Cited

U.S. PATENT DOCUMENTS

| 8,068,826 | B2 * | 11/2011 | Kuffner et al. ................ 455/423 |
| 2006/0105797 | A1 | 5/2006 | Marsan et al. |
| 2009/0029647 | A1 | 1/2009 | Wei et al. |
| 2009/0092185 | A1 * | 4/2009 | Kwon et al. ............ 375/240.01 |
| 2009/0111400 | A1 | 4/2009 | Kazmi et al. |
| 2010/0259682 | A1 | 10/2010 | Unger |

FOREIGN PATENT DOCUMENTS

| WO | 2012088460 A2 | 6/2012 |
| WO | 2012088460 A3 | 8/2012 |

OTHER PUBLICATIONS

International Search Report & Written Opinion received for PCT Patent Application No. PCT/US2011/066943, mailed on Jun. 14, 2012, 10 pages.

* cited by examiner

*Primary Examiner* — Lee Nguyen
(74) *Attorney, Agent, or Firm* — Schubert Law Group PLLC; Jeffrey S. Schubert

(57) ABSTRACT

Embodiments may comprise logic such as hardware and/or code to adaptively control the transmission power for a wireless channel. In many embodiments, adaptively controlling the transmission power may reduce or, in some embodiments, minimize interference between the wireless display (WiDi) transmissions and other transmissions such as multimedia content streaming over another wireless channel to the notebook via a second generation (2G) channel, third generation (3G) channel, or a future long term evolution (LTE) channel.

27 Claims, 4 Drawing Sheets

WIRELESS DISPLAY PERFORMANCE ENHANCEMENT

BACKGROUND

The present disclosure relates generally to wireless communications technologies. More particularly, the present disclosure relates to wireless display performance enhancement.

Wireless capability allows a variety of devices to communicate with each other adding to the mobility of users. A computing device, such as a Personal Computer (PC), may be used with various peripherals that are not wired together, but rather communicate using wireless communications, such as Wireless Local Area Network (WLAN) type protocols. As the PC performs operations, changes to information for display are sent to a wireless display device.

Wireless display (WiDi) is a technology in which image information, such as video information and audio information, on a computer display/screen is captured and encoded, and is then wirelessly transmitted to an adapter. For example, the video information and audio information may be wirelessly transmitted through WiFi™, which is a superset of the standards of IEEE 802.11 for a WLAN protocols. The video data is then decoded and displayed on another screen, such as a screen on a high definition television (HDTV) and the audio may be decoded and sounded through speakers for the HDTV. The quality of the video and audio expressed by the HDTV is dependent upon the throughput of the wireless channel for transmitting the encoded video and audio data. The throughput of the wireless channel is dependent upon channel conditions, such as the signal to noise ratio (SNR), which may detrimentally change to adversely affect video quality on the display screen and/or the audio quality sounded by the speakers.

DETAILED DESCRIPTION OF EMBODIMENTS

Figure 1:
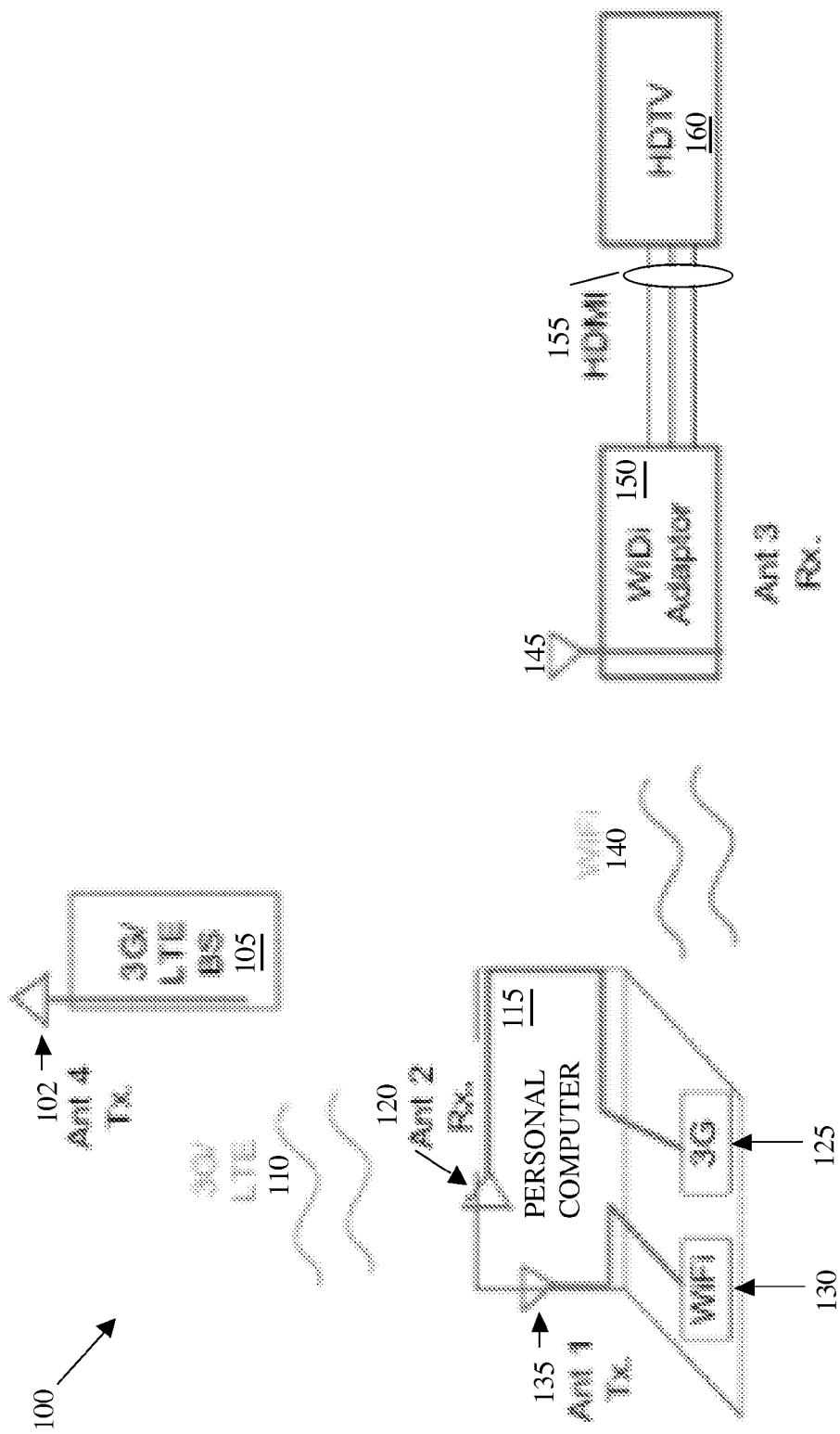
FIG. 1 depicts an embodiment of a system to enhance performance of wireless display.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Wireless personal area network (WPAN) protocols and devices enable mobility and flexibility in computing systems, where devices and components may be implemented using wireless technology. For example, a personal computer (PC) may include a wireless processing unit, a wireless keyboard, a wireless mouse, and a wireless display. The PC then sends wireless signals to a display or other unit that contains a wireless adapter for receiving wireless signal, thus reducing the wired connections of a system. A system using for example WPAN 802.11 a/b/g/n protocol signaling enables hundreds of Megabits of wireless communications over a local area network (LAN) using Orthogonal frequency-division multiplexing (OFDM) technology.

Wireless devices that use the 802.11b/g/n protocol may use the 2.4 Gigahertz (GHz) license free band and may occasionally suffer interference from other devices and appliances utilizing 2.4 GHz signals such as microwave ovens, cordless telephones and Bluetooth devices. Network resources may also be shared with other 802.11b/g/n wireless devices and applications and may therefore cause co-channel and adjacent channel interference. The quality of the received wireless signal is strongly dependent on the channel condition, which is in turn dependent on the sharing of channel resources with other wireless devices and applications.

An increasing number of people are using their PCs to access the wide Internet multi-media resources (such as video and audio content) through mobile telecommunication networks such as second generation (2G), third generation (3G), or future long term evolution (LTE). With wireless display (WiDi) technology, people can display multi-media content streamed from Internet to high definition television (HDTV). For example, a notebook may include a 3G wireless radio module to access the Internet through a cellular network and a WiFi™ wireless module that can transmit encoded audio and video received by the 3G wireless module to a WiDi adapter coupled with an HDTV. When the WiFi™ wireless module is transmitting the display content, the WiFi™ wireless module behaves as radio frequency (RF) interference, impacting 3G radio reception of multimedia content from Internet. If the 3G reception is impacted by WiFi™ transmissions, the quality of the multimedia content is degraded. When the distorted content is received by WiDi adapter and displayed on HDTV, the user will experience visual defects.

Generally, wireless display performance enhancements are described herein. Embodiments may comprise logic such as hardware and/or code to adaptively control the transmission power for a wireless channel for a wireless display transmission. In many embodiments, adaptively controlling the transmission power may reduce or, in some embodiments, minimize interference between the wireless display (WiDi) transmissions and other transmissions such as multimedia content streaming over another wireless channel to the notebook via a second generation (2G) channel, third generation (3G) channel, a future long term evolution (LTE) channel, or the like.

Several embodiments may adaptively control the transmit power of a WiFi™ radio and thus reduce the unnecessary radio interference without impacting or without significantly impacting WiDi performance. Such embodiments save platform power and increase battery life, i.e., the amount of time the battery can power the platform before the battery requires a recharge. Several embodiments may also increase battery lifespan.

In some embodiments, WiFi™ link capacity is calculated inside a WiFi™ driver based upon the WiFi™ link statistics such as the data rate and packet error rate. While WiDi is running, the WiFi™ transmitter feeds the packet information such as the physical data rate, number of passing packets, and number of failing packets to the WiDi channel monitor tool (CMT) to calculate the instantaneous link capacity. The CMT may estimate link capacity based upon, e.g., the packet error rate per each physical data rate, the number of packets transmitted with each rate, the maximum throughput based upon user datagram protocol (UDP), and a video contention window of, e.g., 7 slots (minimum) to 15 slots (maximum). The CMT is developed to capture this value and expose the value to user space, which can be accessed by application level. This capacity value can be a direct indication of the WiFi™ link quality. In many embodiments, the WiFi™ transmit power is only reduced to a certain level at which the WiFi™ link capacity can be sustained.

In several embodiments, WiFi™ is used for WiDi and the WiFi™ throughput requirements can be derived from the encoder configurations. The WiFi™ throughput requirements can be used as a guideline for the WiFi™ transmitter to determine whether transmit power can be reduced or not. More specifically, the WiFi™ driver may calculate throughput achieved based on past packet transmit history. The WiFi™ transmitter may adjust its transmission power to allow a throughput margin to overcome channel fluctuation.

Embodiments may use the 802.11 WLAN protocol including 802.11a/b/g/n and 802.11AC with OFDM technology at either a 2.4 GHz or 5 GHz band or 802.11AD at a 60 GHz band, or the 802.11AD WPAN protocol including, for example, Ultra Wide Band (UWB) or Bluetooth® (BT), etc. as would be recognized by one skilled in the art. It is noted that, by "video," what is meant in the context of embodiments is a sequence of still images depicting not only scenes in motion but also still scenes. Audio information may also be included in the wireless display transmission.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a system 100. System 100 illustrates interactions of a streaming video source 105, a personal computer 115, a WiDi adapter 150, and a high definition television 160. The streaming video source 105 may stream a video content and, in some embodiments, audio content for, e.g., a movie, a television show, a presentation, an Internet video, or the like. In the present embodiment, the streaming video source 105 streams video and audio content by third generation (3G) or long term evolution (LTE) radio signals 110 via antenna 102.

Personal computer 115 may be a desktop, laptop, notebook, Netbook, personal digital assistant, smart phone, or other computing device. Personal computer 115 comprises a 3G/LTE module 125, which comprises a receiver coupled with an antenna 120 to receive the streaming video content from the streaming video source 105. The streaming video content received by the 3G/LTE module 125 is communicated to a WiFi™ module 135 and is retransmitted by a transmitter of the WiFi™ module 135 as a wireless display transmission 140.

The personal computer 115 includes hardware and logic to reduce interference between the wireless display transmission and the 3G/LTE radio signals 110. The personal computer 115 includes antenna isolation and adaptive power control. Antenna isolation takes into account a number of factors including placement of antennas 120 and 135 with respect to one another as well as with respect to other potential sources of interference. One factor for antennas used within handheld devices is minimum use of real estate. Because of the increasing number of functions and shrinking sizes of handheld devices, antennas are mounted close to other components such as shields.

The personal computer 115 also includes hardware and logic to reduce interference between the wireless display transmission and the 3G/LTE radio content 110 through adaptive power control of the wireless transmission power for the transmitter of the WiFi™ module 135. In many embodiments, the link quality of the wireless display transmission is maintained. In the present embodiment, the WiFi™ module 135 comprises a transmit power control to adjust the power of the wireless transmission power for the transmitter of the WiFi™ module 135 and a channel capacity monitor tool (CMT) to determine the link quality or an indication of a link quality.

In some embodiments, the adaptive power control of the wireless transmission power for the transmitter of the WiFi™ module 135 is based upon a link capacity as an indicator of the link quality. For example, the CMT may calculate the instantaneous link capacity based upon the data rate and packet error rate or the number of passing packets and the number of failing packets. The CMT may also estimate a link capacity based upon a range of packet passing rates, a packet error rate, a maximum throughput based upon a uniform datagram protocol and a video contention window. Such a capacity value may be a direct indication of the WiFi™ link quality and the wireless transmission power for the transmitter of the WiFi™ module 135 may be reduced by one or more power adjustments to a suitable power level at which the WiFi™ link quality can be maintained. In many embodiments, the suitable power level may be found by reducing the wireless transmission power for the transmitter of the WiFi™ module 135 in increments until the link quality is degraded. After determining that the link quality is degraded, the wireless transmission power for the transmitter of the WiFi™ module 135 may be increased to the suitable power level. In other embodiments, the wireless transmission power for the transmitter of the WiFi™ module 135 may be reduced to an estimated or predetermined power level.

In several embodiments, the adaptive power control of the wireless transmission power for the transmitter of the WiFi™ module 135 is based upon a link throughput as an indicator of the link quality. For example, the channel capacity monitor tool may calculate a current throughput based upon past packet transmit history. A target or selected throughput may be selected based upon encoding configurations and a quality of service (QoS) associated with the wireless display transmission. In many embodiments, the transmitter of the WiFi™ module 135 may determine a range of throughputs about the selected throughput to allow for channel fluctuation. The wireless transmission power for the transmitter of the WiFi™ module 135 may be adjusted until the current throughput is within the range of throughputs about the selected throughput. Such a throughput value may be a direct indication of the WiFi™ link quality. A transmit power control may reduce the wireless transmission power for the transmitter of the WiFi™ module 135 by one or more power adjustments to a suitable power level at which the WiFi™ link quality may be maintained. In many embodiments, the suitable power level may be found by reducing the wireless transmission power for the transmitter of the WiFi™ module 135 in increments until the link throughput is degraded to a throughput outside of the range of required (or selected) throughputs. After determining that the link quality is degraded, the wireless transmission power for the transmitter of the WiFi™ module 135 may be increased to the suitable power level. In other embodiments, the wireless transmission power for the transmitter of the WiFi™ module 135 may be reduced to an estimated or heuristically selected power level.

Once the suitable power level is determined, some embodiments will maintain the wireless transmission power for the transmitter of the WiFi™ module 135 at the determined power level or at least within a range of power levels about the determined power level to account for channel fluctuation. In some embodiments, the power for the transmitter of the WiFi™ module 135 may be adjusted up and down to maintain the determined power level such that the current throughput is maintained within the range of throughputs about the selected throughput. In several embodiments, channel fluctuation is accounted for by allowing the link capacity to vary by approximately plus or minus 30%. In other embodiments, the link capacity is maintained within a smaller margin of error. In further embodiments, the link capacity is maintained within a larger margin of error. In still other embodiments, the margin of error may not be symmetrical about the determined power level.

A connector of the WiFi™ module 135 is wired to antenna 135, which can transmit the WiFi™ signals 140 with video encoded display data and encoded audio data to the WiDi adapter 150 via an antenna 145. The WiDi adapter 150 can decode and transmit the streaming multimedia (video and audio) content to the high-definition television 160 via, e.g., a high-definition multimedia interface (HDMI) cable 155. In other embodiments, the WiDi adapter 150 may interconnect with the high-definition television via another interface.

Figure 2:
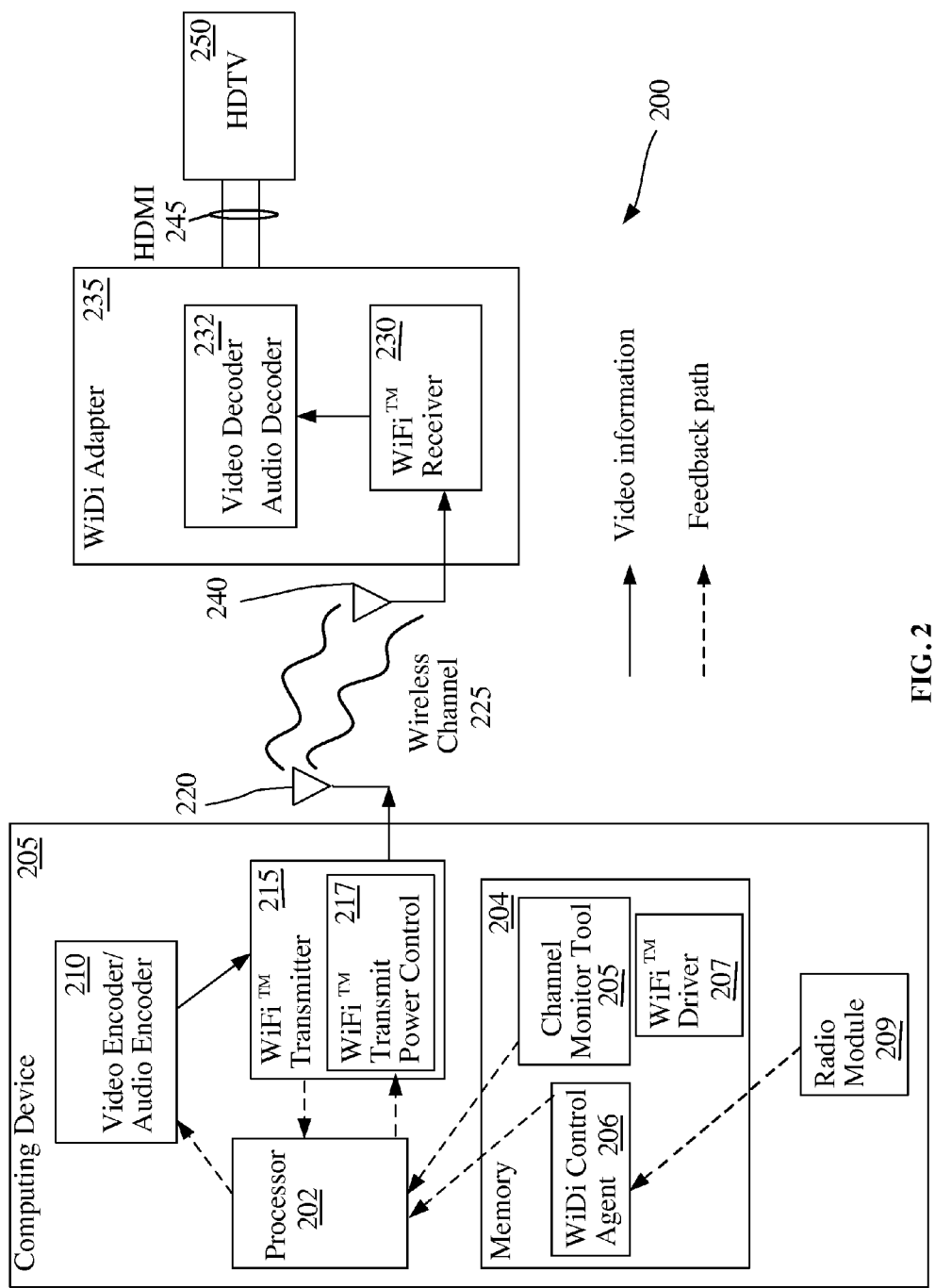
FIG. 2 depicts an embodiment of another system to enhance performance of wireless display.

Turning now to FIG. 2, there is shown an embodiment of a system 200. The system 200 may, for example, include a computing device 205, which may include a processor 202 and a memory 204 as shown. In some embodiments, the computing device 205 may include a desktop computer, personal computer, workstation, server, or a portable wireless communication device, such as a notebook, laptop, Netbook, smart phone, personal digital assistant (PDA), a web tablet, a wireless telephone, an instant messaging device, a digital camera, an access point, a television, a medical device (e.g., a heart rate monitor, a blood pressure monitor, etc.), or other device that may receive and/or transmit information wirelessly. The computing device 205 may comprise a radio module 209 comprising a wireless receiver, a video encoder/audio encoder 210, and a WiFi™ transmitter 215.

The radio module 209 may be a wireless module for receiving and/or transmitting data. In the present embodiment, the radio module 209 may comprise a second generation, (2G), third generation (3G), or long term evolution (LTE) module although further embodiments may comprise different types of wireless communications modules. The radio module 209 may receive audio and video data via a wireless transmission. Reception of the wireless transmission may be susceptible to interference from the WiFi™ transmitter 215 while operating concurrently. The computing device 205 may use the video encoder/audio encoder 210 to compress video data and audio data into an audio/video signal for a wireless display transmission via the WiFi™ transmitter 215. And the processor 202 may execute code from the memory 204 to adaptively adjust the transmission power of the WiFi™ transmitter 215 to reduce or eliminate interference with reception by the radio module 209.

The WiFi™ transmitter 215 may transmit the compressed video and audio data via an antenna 220 through an interface protocol by way of a wireless channel 225 and may send information regarding video data, such as packet information such as physical data rate, number of passing packets, number of failing packets, etc., to the processor 202. The interface protocol may include a local area network (LAN) 802.11a/b/g/n, 802.11 AC and 802.11AD protocol, or a personal area network (PAN) protocol such as, for example, ultra wide band (UWB), Bluetooth® (BT), or the like. The compressed video and audio signal may be received by a WiFi receiver 230 that is part of a WiDi (wireless display) adapter 235 by way of an antenna 240. The WiFi™ receiver 230 may send the received compressed video and audio data to a video decoder/audio decoder 232 for video decompression and audio decompression, after which the decompressed video data and audio data may be sent to a display device such as HDTV 250 using an interface protocol such as High-Definition Multimedia Interface (HDMI) via an HDMI cable 245. Other embodiments may use other interface protocols such as a Mobile Industry Processor Interface (MIPI) Display Serial Interface (DSI), regardless of the content of the display data. Thus, both the computing device 205 and the WiDi adapter 235 may support wireless communications. Although not shown, embodiments also encompass integrating the WiDi adapter 235 into the TV to save an HDMI wired connection, or to have a wireless connection between the adapter and the TV.

In some embodiments, the WiFi™ transmitter 215 may be configured to transmit Orthogonal Frequency-Division Multiplex (OFDM) communication signals over a multicarrier communication channel. The OFDM signals may comprise a plurality of orthogonal subcarriers. In some of these multicarrier embodiments, the WiFi™ transmitter 215 may be part of a Wireless Local Area Networks (WLANs) communication station such as a Wireless Access Point (WAP), base station or a mobile device including a Wireless-Fidelity (Wi-Fi) device. In some other embodiments, the WiFi™ transmitter 215 may be configured to transmit signals that were transmitted using one or more other modulation techniques such as spread spectrum modulation (e.g., Direct Sequence Code Division-Multiple Access (DS-CDMA) and/or Frequency Hopping Code Division-Multiple Access (FH-CDMA)), Time Division-Multiplexing (TDM) modulation, and/or Frequency Division-Multiplexing (FDM) modulation, although the scope of the embodiments is not limited in this respect.

Antennas 220 and 240 may comprise one or more directional or omni-directional antennas, including, for example, dipole antennas, monopole antennas, patch antennas, loop antennas, micro-strip antennas or other types of antennas suitable for transmission of RF signals.

As further seen in FIG. 2, the memory 204 may store processing instructions in the form of a channel monitor tool (CMT) 205 and a WiDi control agent 206. The CMT 205 may be configured to direct the processor 202 to determine a current data transmission rate capacity of the wireless channel 225. The CMT 205 may be further configured to direct the processor 202 to determine whether the current data transmission rate capacity of wireless channel 225 (for example, an average video bit rate) is less than a desired wireless link capacity, or selected throughput requirement, through wireless channel 225.

The WiDi control agent 206 comprises logic to determine the coexistence issue associated with a channel of wireless display transmission by determining the existence of one or more criteria. The WiDi control agent 206 receives from the radio module 209, after the radio module 209 is powered, a frequency channel, a received signal strength indicator (RSSI), and a carrier to interference-plus-noise ratio (CINR). The WiDi control agent 206 runs a co-existence risk test based upon the noise level the radio module 209 received and the frequency channel at which the radio module 209 is operating. For instance, if the channel (2.1 GHz) at which the radio module 209 is operating is close to the WiFi™ 2.4 GHz band and the noise level is high, the WiDi control agent 206 indicates that the risk of interference in the reception of a wireless signal by the radio module 209 from the wireless display transmission emitted from the WiFi™ transmitter 215 is high to the WiFi™ transmit power control 217 of the WiFi™ transmitter 215. In response to the high risk indication from the WiDi control agent 206, the WiFi™ transmit power control 217 starts tuning the transmit power of the WiFi™ transmitter 215. In many embodiments, the transmit power of the WiFi™ transmitter 215 may only be reduced to a power level at which the WiDi link quality is not impacted. Reducing the transmit power of the WiFi™ transmitter 215 reduces the interference by the wireless display transmission on the reception of a wireless transmission by the radio module 209. At the same time, however, reducing the transmit power of the WiFi™ transmitter 215 also reduces its signal strength received by WiDi adapter 235 so the CMT 205 monitors the WiFi™ link quality to maintain a quality of service (QoS) for the wireless display transmission.

In some embodiments, the CMT 205 may comprise logic to determine the link quality by determining a link capacity of the wireless display transmission. Such embodiments monitor the link capacity as an indication of link quality while adaptively controlling the power of the WiFi™ transmitter 215. Using the CMT 205, the processor 202 may estimate the instantaneous channel capacity, that is, the current data transmission rate capacity of the wireless channel 225 using the information regarding video data sent from WiFi™ transmitter 215. The WiFi link capacity is calculated inside WiFi™ driver 207 based on the WiFi link statistics such as the data rate and packet error rate. While WiDi is running, the WiFi™ transmitter 215 feeds the packet information such as the physical data rate, number of passing packets, and number of failing packets to the processor 202 for the CMT 205 to calculate the instantaneous link capacity. The CMT 205 estimates the link capacity based on following metric:

$$WiDiChanCap = \frac{\sum_{i=min(Rate)}^{i=max(Rate)} NumPacket(i) * (1 - PER(i))}{\sum_{i=min(Rate)}^{i=max(Rate)} NumPacket(i) * \frac{1}{MaxTpt(i)}} \quad \text{(Eq. 1)}$$

where:
WiDiChanCapacity is the current data transmission rate capacity of the channel;
i is the physical data rate;
PER is the packet error rate per each physical data rate, that is, the ratio of number of failed packets on the one hand and number of total transmitted packets on the other hand;
NumPacket is the number of packets transmitted with each rate; and
MaxTpt is a maximum throughput of the channel based on an UDP protocol with a video contention window of 7 slots (min) and 15 slots (max), coordinated with a medium access layer or MAC layer. In other embodiments the contention window may differ.

According to some embodiments, the CMT 205 may be configured to allow the processor to determine the current data transmission rate capacity of the channel within a predetermined time interval, such as 100 ms, 500 ms, 1 second or any other interval programmed as part of the CMT code. A minimum loop rate for determining the current data transmission rate capacity of the channel may, for example, depend on the amount of time it would take for any change in bit-rate to take effect within the channel from the time a change of data transmission rate capacity in the channel is detected until a change in transmission rate actually takes effect. For instance, if it takes one second for a change in bit-rate to take effect within the channel from the time that a change in the current data transmission rate capacity is detected, it would make sense to set the loop rate for determining the current data transmission rate capacity of the channel at 1 second or more.

In further embodiments, the CMT 205 comprises logic to determine the link quality by determining a throughput requirement of the wireless display transmission. Such embodiments monitor the link throughput as an indication of link quality while adaptively controlling the power of the WiFi™ transmitter 215. In such embodiments, when WiFi™ is used for WiDi, a selected WiFi™ throughput can be derived from the encoder configurations. The selected throughput can be used as guideline for the WiFi™ transmitter 215 to decide whether the transmit power can be reduced or not. More specifically, the WiFi™ driver 207 calculates the throughput achieved based on past packet transmit history, TPmeasure, and determines whether to reduce, increase, or maintain the power of the WiFi™ transmitter 215 based upon the following relationship, wherein TPWiDi is the selected throughput for the wireless display transmission, WiDi.

$$(1+K1)TPWiDi < TPmeasure < (1+K2)TPWiDi$$

where K1 and K2 reflect the throughput margin to overcome channel fluctuation. More specifically, if TPmeasure is larger than (1+K2)TPWiDi, the WiFi™ transmit power control 217 will reduce the transmit power of the WiFi™ transmitter 215 by one increment. If TPmeasure is smaller than (1+K1) TPWiDi, the WiFi™ transmitter 215 will increase its transmit power by one increment. Otherwise, if (1+K1) TPWiDi<TPmeasure<(1+K2) TPWiDi, the power level of the WiFi™ transmitter 215 will remain unchanged. In some embodiments, (1+K1) TPWiDi may represent 70% of the selected throughput for the WiDi and (1+K2) TPWiDi may represent 130% of the selected throughput for the WiDi. In other embodiments, the range may be smaller and/or asymmetrical about TPmeasure. In further embodiments, the range may be larger and/or asymmetrical about TPmeasure.

Although embodiments have been described for the most part with respect to video encoding for use in wireless display systems, embodiments are not so limited, and may broadly involve an adaptive control of the power for a wireless transmission of any wireless signal based on a current link quality of a wireless channel to transmit the signal.

Figure 3:
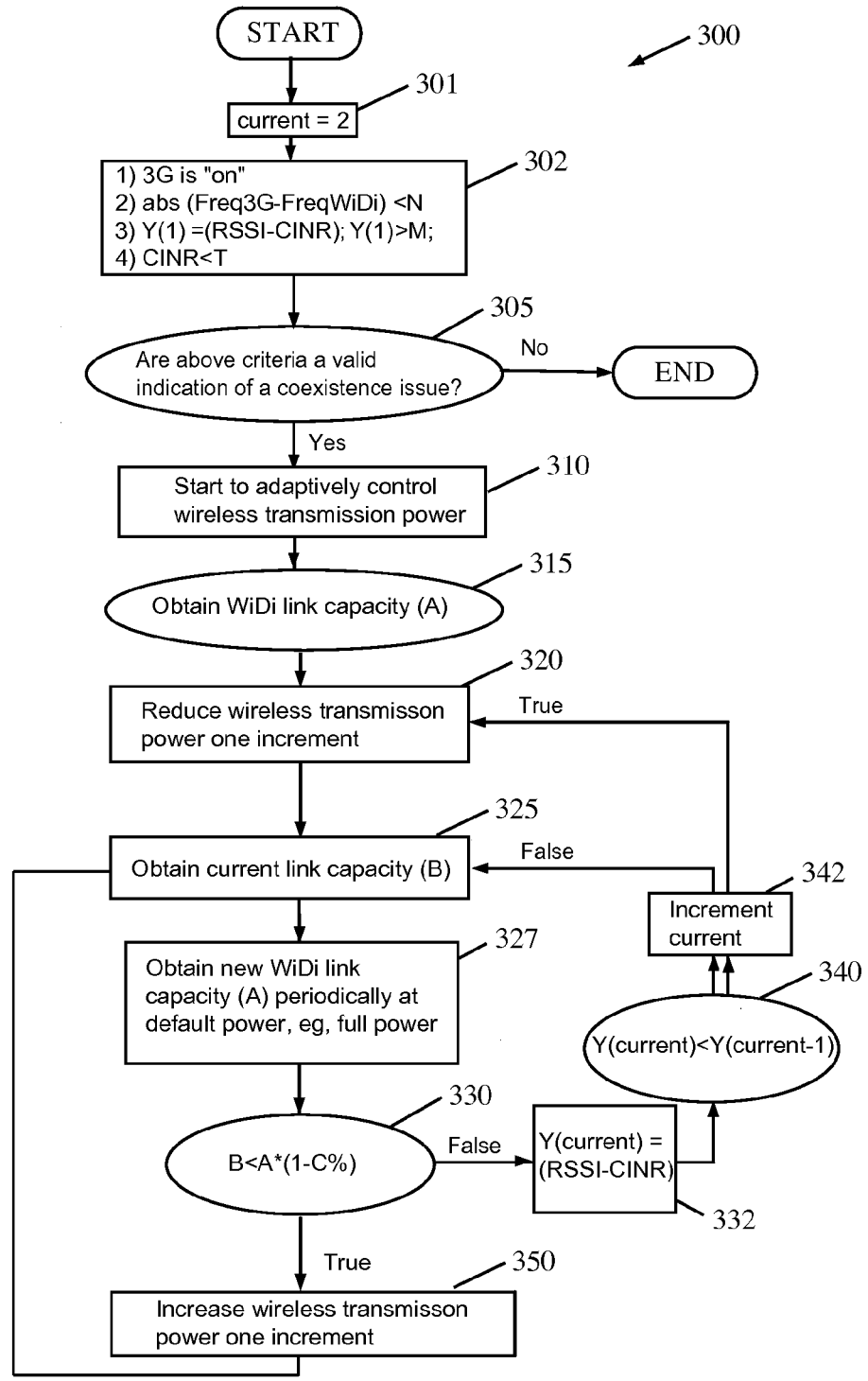
FIG. 3 illustrates a flow chart of an embodiment to enhance performance of wireless display.

FIG. 3 illustrates an embodiment of a flow chart 300 to enhance performance of a wireless display transmission for a system such as system 200 as illustrated in FIG. 2. The flow chart 300 begins with an initial setting of current to a value of 2. This setting facilitates an explanation of the value of Y(2) being set to a new measure of the noise level in the 3G signal at element 332. The flow chart 300 continues with a risk assessment by determining a coexistence issue associated with a channel of wireless display transmission at element 302. More specifically, the element 302 includes four examples of criterion to determine whether or not to implement the adaptive control of transmission power for the wireless display transmission. In some embodiments, all criteria should be met before starting the adaptive power control. In further embodiments, one or more criteria should be met prior to initiating adaptive power control. In other embodiments, the criteria may be similar and/or include the same and/or other criteria. For instance, the present embodiment describes criteria for a 3G radio in the same computing device as the wireless display transmitter. Other embodiments may comprise one or more other radios or wireless receivers that may give rise to one or more coexistence issues.

The first criterion in element 302 for determining the coexistence issue associated with the wireless display transmission may comprise determining whether a wireless receiver for a second wireless channel within the computing device is operating. For instance, a 3G radio may notify a channel monitor tool, also referred to as a channel capacity monitor tool, (CMT) when the 3G radio is activated. In other embodiments, determining whether the wireless receiver for the second wireless channel within the computing device is operating may comprise, e.g., determining whether a second generation or long term evolution radio receiver is operating within the computing device.

The second criterion in element 302 for determining the coexistence issue associated with the wireless display transmission may comprise determining whether a wireless receiver for a second wireless channel within the computing device is at a frequency (Freq3G) near a frequency (FreqWiDi) of the wireless display transmission. A frequency near the frequency of the wireless display transmission may comprise, for instance, a frequency within a frequency range (which is N in this embodiment) within which the wireless receiver of the second wireless channel potentially receives or is estimated to receive the wireless display transmission as interference. The 3G radio may provide the operating frequency to the WiDi control agent to evaluate the criterion.

The third criterion in element 302 for determining the coexistence issue associated with the wireless display transmission may comprise determining whether a wireless receiver for a second wireless channel within the computing device has a received signal strength indicator (RSSI) that is greater than a noise ratio such as a carrier to interference plus noise ratio (CINR) by a threshold (M). In other words, the RSSI minus the CINR is an indication of the noise level and if the noise level is greater than a threshold noise level (M) than there may be a coexistence issue. The 3G radio may provide the RSSI and the CINR to the WiDi control agent to evaluate the criterion.

The fourth criterion in element 302 for determining the coexistence issue associated with the wireless display transmission may comprise determining whether a wireless receiver for a second wireless channel within the computing device has a noise ratio such as a CINR that is less than a threshold noise ratio (T). In other words, as the interference plus noise increases in relation to the carrier signal, the CINR decreases. The greater the interference plus noise is as compared to the carrier signal, the greater the risk is of a coexistence issue between the 3G radio reception and the wireless display transmission.

At element 305, the flow chart 300 determines whether sufficient criteria are met to start to adaptively control the wireless transmission power for the wireless display transmission. In the present embodiment, all criteria, such as the criteria in element 302, should be met to proceed to element 310. If not all criteria are met at element 305, the process ends. In other embodiments, the process continues if one or more of the criteria are met. In further embodiments, the process begins at element 310, skipping a requirement to meet criteria. The flow chart 300 may begin again upon turning on a wireless receiver or radio.

Element 310 demarks the initiation of the process to adaptively control the wireless transmission power for the wireless display transmission. At element 315, an initial WiDi link capacity (A) is determined. The CMT may determine the instantaneous link capacity and estimate the link capacity based upon the instantaneous link capacities.

The power of the transmitter for the wireless display transmission may be reduced by one increment at element 320. The increment may comprise a power adjustment based upon a pre-determined level of power reduction, a calculated level of power reduction, a heuristically determined level of power reduction, a table of power reduction increments, or the like.

Once the power of the transmitter is reduced, the flow chart 300 may continue by determining an effect of adjusting the wireless transmission power of the transmitter on the channel of the wireless display transmission at element 325. In the present embodiment, the effect may be determined by calculating the subsequent link capacity (B).

The process of obtaining a new WiDi link capacity (A) at default power, which may be full power, will periodically be executed at element 327. Monitoring the changes in the WiDi link capacity (A) may improve the results by taking into account the changes in the WiDi link capacity (A) due to changes, e.g., in the environment. In some embodiments, a new WiDi link capacity (A) at default power is obtained in every loop from element 325 through element 330. In other embodiments, obtaining a new WiDi link capacity (A) at default power may occur less often such as once every other, every few, or every four or more passes through elements 325 and 330. In many embodiments, obtaining a new WiDi link capacity (A) at default power may not occur in the first pass through element 327 since obtaining a new WiDi link capacity (A) at default power recently occurred at element 315.

If the subsequent link capacity (B) is degraded such that B<A*(1-C %), wherein C is a margin of error for channel fluctuation, at element 330, then the power of the transmitter for the wireless display transmission will be increased by an increment at element 350.

On the other hand, if the link capacity (B) for the wireless display transmission is not degraded, i.e., B=>A*(1−C %), the flow chart 300 continues by setting Y(current) to the current noise level of the 3G radio and by determining whether there is a reason to continue to reduce the power for the transmitter of the wireless display transmission at element 340. Element 342 increments the value of current. If the noise level (Y) in the signal received by the 3G radio has reduced as a result of the reduction of the power to the transmitter of the wireless display transmission, the process proceeds to element 320 to reduce the wireless transmission power by another increment.

On the other hand, if there is no perceived improvement in the noise level in the signal received by the 3G radio at element 340, the process proceeds to element 325 to obtain a subsequent link capacity. This latter process may continue, maintaining the power level of the transmitter for the wireless display transmission.

In some embodiments, reducing the wireless transmission power of the transmitter by an increment at element 320 and determining a subsequent link quality at element 325 after reducing the wireless transmission power of the transmitter by the increment to reach a power level at which the link quality is maintained may comprise reducing the wireless transmission power below the power level and increasing the wireless transmission power to the power level. In other words, the process illustrated in flow chart 300 may reduce the power of the transmitter to a power level an increment below a desired power level. In such instances, the feedback in the form of the link capacity will indicate that the link capacity is below the WiDi link capacity including the margin of error provided for channel fluctuation. The process proceeds to reach the appropriate power level by increasing the power level by an increment.

Figure 4:
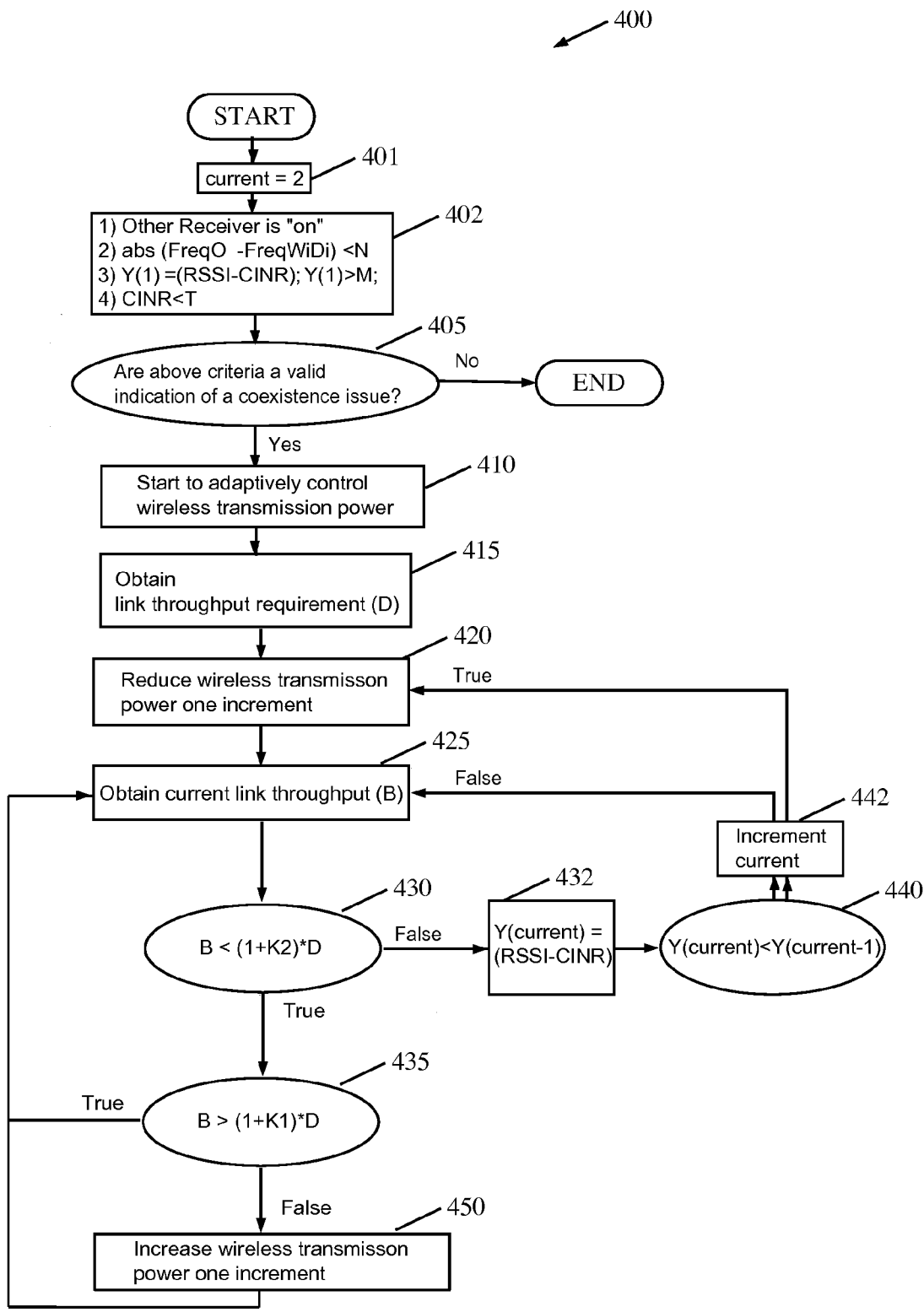
FIG. 4 illustrates a flow chart of another embodiment to enhance performance of wireless display.

FIG. 4 illustrates an embodiment of a flow chart 400 to enhance performance of a wireless display transmission for a system such as system 200 as illustrated in FIG. 2. The flow chart 400 begins with setting a variable, current, to a value of 2. Setting current to a value of 2 is for the purposes of explanation with elements 401, 432, and 442 and the process this facilitates can be done in a number of other ways in other embodiments. The flow chart 400 continues with a risk assessment by determining a coexistence issue associated with a channel of wireless display transmission at element 402. More specifically, the element 402 includes four examples of criterion to determine whether or not to implement the adaptive control of transmission power for the wireless display transmission such as if a wireless receiver for a second channel is powered "on", if the frequency of the second channel is near the frequency of the wireless display transmission channel, if the noise level calculated for the second channel is greater than a threshold noise level (M), and if the signal to noise ratio, such as CINR, is less than a threshold signal to noise ratio.

The validity of all criteria may indicate possible performance degradation due to radio frequency (RF) interference from WiDi transmission. If the criteria are valid at element 405, the process of adaptively controlling the transmission power for the WiDi begins at element 410. Otherwise the process would end after element 405. In other embodiments, less than all or even different criteria may be evaluated to determine whether to start the process of adaptively controlling the transmission power of the transmitter for the wireless display transmission.

At element 415, the selected WiDi throughput (TPWiDi) is fed as an input before any WiDi transmit power adjustments. A power adjustment is made to the transmission power for the WiDi at element 420. The link throughput (B) is re-evaluated after the power adjustment at element 425, and then compared with the selected WiDi throughput at elements 430 and 435.

If the link throughput, $B<(1+K2)$ TPWiDi is true at element 430, and $B>(1+K1)$ TPWiDi is false at element 435, then the throughput has been degraded by the power reduction, where K1 and K2 represent expected or determined channel fluctuation. In response, the process proceeds to element 450 wherein the wireless transmission power is increased by one increment. The link throughput is then re-evaluated to determine the state of the link and to maintain the power level if the throughput is between $(1+K1)*D$ and $(1+K2)*D$.

If $B<(1+K2)$ TPWiDi is false at element 430, element 432 sets Y(current) the current noise level and if the noise level (Y) received by second wireless receiver is reduced as measured by metric of $Y(current)<Y(current-1)$ at element 440, then the process continues by incrementing current through element 442, by reducing the WiFi™ transmit power by one more level at element 420. On the other hand, if $B<(1+K2)$ TPWiDi is false at element 430 and if the noise level (Y) is not reduced as measured by metric of $Y(current)<Y(current-1)$ at element 440, then the process continues and the WiFi™ transmit power remains unchanged. Furthermore, if $B<(1+K2)$ TPWiDi is true at element 430 and if $B>(1+K1)$ TPWiDi is true at element 435, then the WiFi™ transmit power also remains unchanged.

Another embodiment is implemented as a program product for implementing systems and methods described with reference to FIGS. 1-4. Embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Note that a tangible storage medium does not store signals but stores one or more values representative of data. A medium can be an electronic, magnetic, optical, electromagnetic, infrared, or semiconductor system (or apparatus or device) or a propagation medium. Examples of a computer-readable storage medium include tangible media such as semiconductor or solid-state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet adapter cards are just a few of the currently available types of network adapters.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It will be apparent to those skilled in the art having the benefit of this disclosure that the present disclosure contemplates wireless display performance enhancement. It is understood that the form of the embodiments shown and described in the detailed description and the drawings are to be taken merely as examples. It is intended that the following claims be interpreted broadly to embrace all variations of the example embodiments disclosed.

What is claimed is:

1. A method to enhance wireless display performance, the method comprising:
   determining a coexistence issue associated with a channel of wireless display transmission, wherein determining the coexistence issue associated with the wireless display transmission comprises determining whether a wireless receiver for a second wireless channel within a computing device is operating, wherein the computing device comprises the transmitter and originates the wireless display transmission;
   determining, by the computing device, a power adjustment for a transmitter for the wireless display transmission;
   adjusting, by the computing device, a wireless transmission power of the transmitter for the wireless display transmission based upon the power adjustment; and
   maintaining, by the computing device, the wireless transmission power at a power level that maintains a level of transmission quality of the wireless display transmission.

2. The method of claim 1, wherein determining whether the wireless receiver for the second wireless channel within the computing device is operating comprises determining whether a second generation, third generation, or long term evolution radio receiver is operating within the computing device.

3. The method of claim 1, wherein determining the coexistence issue associated with the wireless display transmission comprises determining whether a wireless receiver for a second wireless channel within the computing device is at a frequency near a frequency of the wireless display transmission, wherein a frequency near the frequency of the wireless display transmission comprises a frequency within a frequency range within which the wireless receiver of the second wireless channel potentially receives the wireless display transmission as interference.

4. The method of claim 1, wherein determining the coexistence issue associated with the wireless display transmission comprises determining whether a wireless receiver for a second wireless channel within the computing device has a noise ratio that is less than a threshold.

5. The method of claim 4, wherein determining whether the wireless receiver for the second wireless channel within the computing device has the noise ratio that is less than the threshold comprises determining whether a carrier to interference plus noise ratio that is less than the threshold ratio.

6. The method of claim 1, further comprising determining an effect of adjusting the wireless transmission power of the transmitter on the channel of the wireless display transmission.

7. The method of claim 6, wherein determining the effect of adjusting the wireless transmission power of the transmitter on the channel of the wireless display transmission comprises determining that adjusting the wireless transmission power degraded the quality of the wireless display transmission.

8. The method of claim 1, further comprising determining an effect of adjusting the wireless transmission power of the transmitter on a noise ratio of a second wireless channel within the computing device is operating.

9. The method of claim 1, wherein determining the power adjustment for the transmitter for the wireless display transmission and adjusting the wireless transmission power of the transmitter for the wireless display transmission based upon the power adjustment comprises:
   determining an indication of a link quality for the channel of wireless display transmission; and
   reducing the wireless transmission power of the transmitter by an increment and determining a subsequent link quality after reducing the wireless transmission power of the transmitter by the increment to reach a power level at which the link quality is maintained.

10. The method of claim 9, wherein determining the indication of the link quality for the channel of wireless display transmission comprises determining an instantaneous link capacity for the channel of wireless display transmission.

11. The method of claim 10, wherein determining the indication of the link quality for the channel of wireless display transmission comprises estimating a link capacity for the channel of wireless display transmission based upon an instantaneous link capacity for the channel of wireless display transmission.

12. The method of claim 9, wherein reducing the wireless transmission power of the transmitter by an increment and determining a subsequent link quality after reducing the wireless transmission power of the transmitter by the increment to reach a power level at which the link quality is maintained comprises reducing the wireless transmission power below the power level and increasing the wireless transmission power to the power level.

13. The method of claim 9, wherein determining an indication of a link quality for the channel of wireless display transmission comprises determining a throughput achieved by the wireless display transmission, wherein the throughput is the link quality.

14. The method of claim 9, wherein reducing the wireless transmission power of the transmitter by an increment and determining a subsequent link quality after reducing the wireless transmission power of the transmitter by the increment to reach a power level at which the link quality is maintained comprises reducing the wireless transmission power to the power level wherein the power level is a power level at which the throughput is within a range of throughputs that comprise a selected throughput for the wireless display transmission.

15. The method of claim 9, wherein maintaining the wireless transmission power at a power level that maintains a level of transmission quality of the wireless display transmission comprises reducing and increasing the wireless transmission power within a range of about the link quality.

16. An apparatus to enhance wireless display performance, the apparatus comprising:
   a control agent comprising logic to determine a coexistence issue associated with a channel of wireless display transmission, wherein logic to determine the coexistence issue associated with the wireless display transmission comprises logic to determine whether a wireless receiver for a second wireless channel within a computing device is operating, wherein the computing device comprises the transmitter to originate the wireless display transmission;
   a transmit power control of the computing device to determine a power adjustment for a transmitter for the wireless display transmission; to adjust a wireless transmission power of the transmitter for the wireless display transmission based upon the power adjustment; and to maintain the wireless transmission power at a power level that maintains a level of transmission quality of the wireless display transmission; and a channel capacity monitor tool of the computing device to determine a link quality of the wireless display transmission.

17. The apparatus of claim 16, wherein the control agent comprises logic to determine the coexistence issue by determining the existence of one or more criteria.

18. The apparatus of claim 16, wherein the channel capacity monitor tool comprises logic to determine the link quality by determining a link capacity of the wireless display transmission.

19. The apparatus of claim 16, wherein the channel capacity monitor tool comprises logic to determine the link quality by determining a throughput of the wireless display transmission.

20. The apparatus of claim 16, wherein the transmit power control comprises logic to reduce the wireless transmission power of the transmitter by an increment; to receive a subsequent link quality reflective of the change in wireless transmission power; and to determine whether to reduce the wireless transmission power again based upon the subsequent link quality.

21. A system to enhance wireless display performance, the system comprising:
 a wireless receiver of a computing device to receive a wireless data transmission;
 a wireless transmitter of the computing device to transmit a wireless display transmission;
 a control agent comprising logic to determine a coexistence issue associated with a channel of the wireless display transmission, wherein logic to determine the coexistence issue associated with the wireless display transmission comprises logic to determine whether the wireless receiver for a second wireless channel within the computing device is operating;
 a transmit power control of the computing device to determine a power adjustment for the wireless transmitter for the wireless display transmission; to adjust a wireless transmission power of the wireless transmitter for the wireless display transmission based upon the power adjustment; and to maintain the wireless transmission power at a power level that maintains a level of transmission quality of the wireless display transmission; and
 a channel capacity monitor tool of the computing device to determine a link quality of the wireless display transmission.

22. The system of claim 21, further comprising the control agent to determine a coexistence issue associated with a channel of wireless display transmission by determining the existence of one or more criteria.

23. The system of claim 21, wherein the wireless receiver comprises a second generation, third generation, or long term evolution radio receiver.

24. A computer program product to enhance wireless display performance, the computer program product comprising:
 a computer useable storage medium having a computer useable program code embodied therewith, the computer useable program code comprising: computer useable program code configured to perform operations, the operations comprising:
 determining a coexistence issue associated with a channel of wireless display transmission, wherein determining the coexistence issue associated with the wireless display transmission comprises determining whether a wireless receiver for a second wireless channel within a computing device is operating, wherein the computing device comprises the transmitter and originates the wireless display transmission;
 determining, by the computing device, a power adjustment for a transmitter for the wireless display transmission;
 adjusting, by the computing device, a wireless transmission power of the transmitter for the wireless display transmission based upon the power adjustment;
 maintaining, by the computing device, the wireless transmission power at a power level that maintains a level of transmission quality of the wireless display transmission.

25. The computer program product of claim 24, wherein the operations further comprise determining a coexistence issue associated with a channel of wireless display transmission by determining the existence of one or more criteria.

26. The computer program product of claim 24, wherein the operation of determining the power adjustment for the transmitter for the wireless display transmission and adjusting the wireless transmission power of the transmitter for the wireless display transmission based upon the power adjustment comprises:
 determining an indication of a link quality for the channel of wireless display transmission; and
 reducing the wireless transmission power of the transmitter by an increment and determining a subsequent link quality after reducing the wireless transmission power of the transmitter by the increment to reach a power level at which the link quality is maintained.

27. The computer program product of claim 24, wherein the operation determining the indication of the link quality for the channel of wireless display transmission comprises determining a link capacity for the channel of the wireless display transmission or determining a throughput for the channel of the wireless display transmission.

* * * * *